Aug. 13, 1935. O. L. GOETHEL 2,010,986
SPRING CONSTRUCTION
Filed Oct. 7, 1931 2 Sheets-Sheet 1
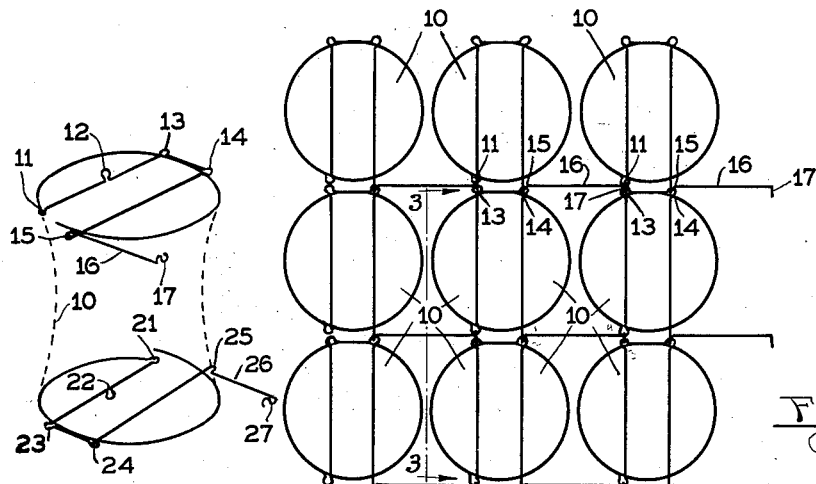
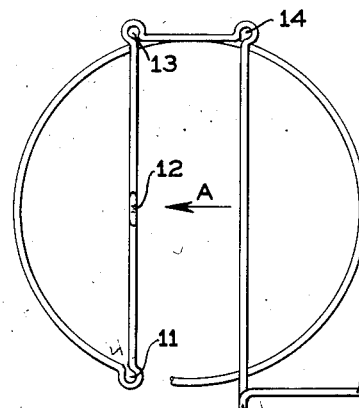
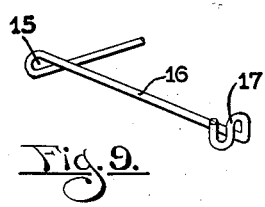
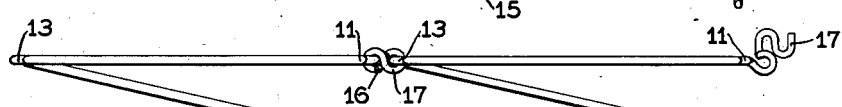
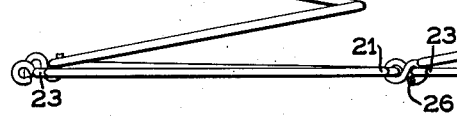
Inventor
Otto L. Goethel Aug. 13, 1935.   O. L. GOETHEL   2,010,986
SPRING CONSTRUCTION
Filed Oct. 7, 1931   2 Sheets-Sheet 2
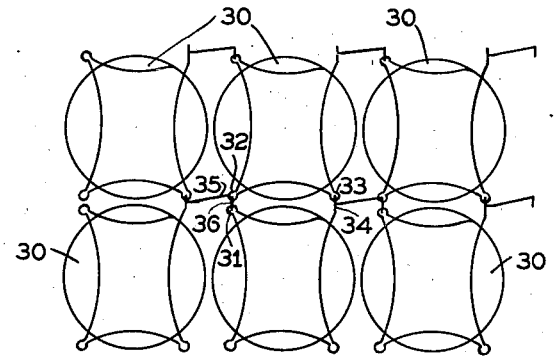
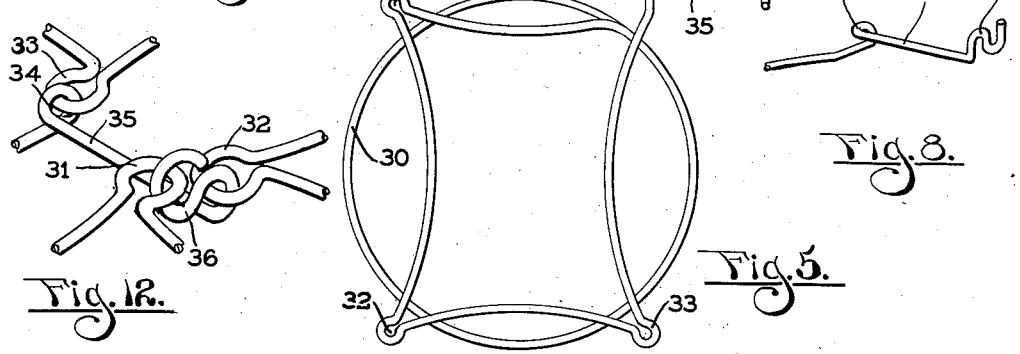
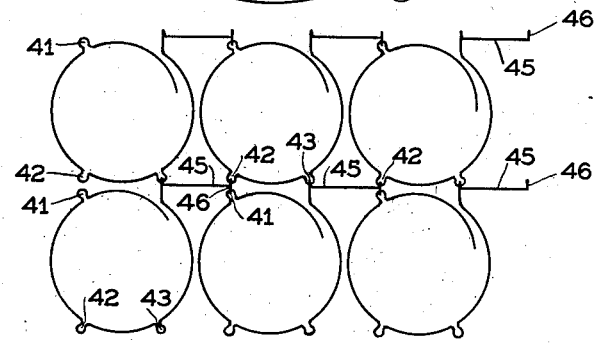
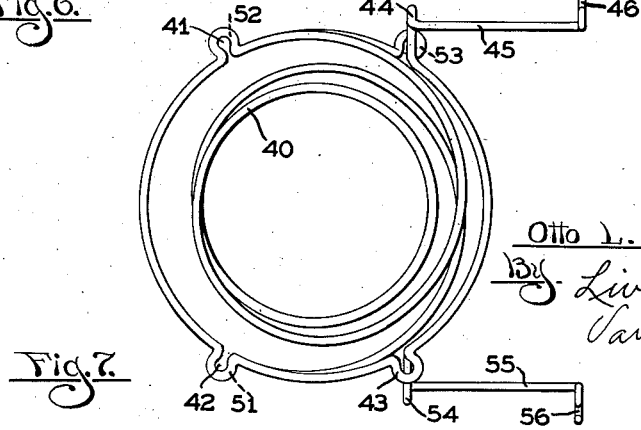
Inventor
Otto L. Goethel
By Livrance and Van Antwerp
Attorneys Patented Aug. 13, 1935

2,010,986

UNITED STATES PATENT OFFICE 2,010,986

SPRING CONSTRUCTION

Otto L. Goethel, Grand Rapids, Mich.

Application October 7, 1931, Serial No. 567,458

6 Claims. (Cl. 5—271)

My invention relates generally to spring construction and more particularly to the creation of a spring unit which may be joined to other units to form the finished article without additional fastening means therefor.

Springs of the character herein referred to are widely used interiorly of mattresses, although they may be used in many other places, in order that they may be soft and yielding, as is readily understood, but previous to my invention it has been necessary to provide additional fastening means of some kind or other in order to hold and maintain the several spring units in proper relationship to each other. Not only is the extra fastening means objectionable due to its first cost as well as its cost of installation but it also has the disadvantage of making the complete spring unit sectional in character. In other words, several of the individual springs are tied or fastened together and these tied units function more or less individually as units thus giving to the complete spring a more or less irregular action.

Now, in my improved construction, it is my aim to provide a spring which is made up of a plurality of single spring units, each of these units being exactly identical in construction, whereby their manufacture is expedited, and each spring unit having an integral arm or tie extending therefrom whereby suitable connection between the several spring units is had.

Another major advantage lies in the type of connection which I utilize between the spring units. All connections are so formed as to be free and thus each spring unit has a limited free movement relative to its adjacent springs, thus giving a manner of operation to the complete spring construction which is symmetrical and which is exceedingly desirable as will be readily understood by those skilled in this art. In other words each spring is pivoted to its neighboring springs.

Another advantage accrues from the fact that the fastening hook or means located at the top of each spring on the end of the integral arm is faced upwardly whereby it is precluded from accidentally catching or gripping the coils of the spring when it is forced downwardly during operation and then slipping from such position to cause noise between the parts of the spring.

Another advantage lies in my construction which is such that it may be applied to either the cylinder type or to the "hour glass" type of spring.

Also, in my novel coil construction the eyes or loops at either end thereof may be fastened together in any desired manner, as by means of a helical wire. This "helical" is a separate and distinct element and when used dispenses with the utility of the arm and its double eye.

Other objects, advantages and meritorious qualities reside in the special construction, combination and arrangement of the various elements forming the invention as more fully hereinafter described and claimed, reference being had to the accompanying drawings forming part hereof, wherein:

Fig. 1 is a plan view of one of the several modifications of my spring construction, this construction being made by interlocking a number of my spring units together.

Fig. 2 is a top or plan view of a single unit spring as disclosed in Fig. 1, this view omitting certain parts for the sake of clearness.

Fig. 3 is a side view showing two springs interlocked with each other, these springs being of the construction illustrated in Figures 1 and 2 and this view being taken along the plane of line 3—3 of Fig. 1.

Fig. 4 is a plan or top view of a series of springs pivotally connected together in my improved manner, these spring units being of the preferred construction as illustrated in Fig. 5.

Fig. 5 is a plan view of one of the individual spring units shown in Fig. 4, the lower arm of the spring being omitted.

Fig. 6 shows another type of spring construction.

Fig. 7 illustrates the individual spring unit of Fig. 6.

Fig. 8 is a perspective view showing the eye construction of the upper end of the spring unit shown in Figs. 6 and 7.

Fig. 9 is a perspective view showing the shape of the upper arm of the spring shown in Fig. 2, this arm serving to attach four corners of four different springs together.

Fig. 10 is a diagrammatic perspective view showing the construction of the form of my spring unit as shown in Figs. 1, 2, 3, 9 and 10.

Fig. 11 is a view looking in the direction indicated by the arrow A in Fig. 2, this view showing an eye construction which is utilized when the several rows of spring units are assembled in nested position.

Fig. 12 is a perspective view showing the typical connection between the arms of one spring unit and the three adjacent units, this view being specific to my preferred type of spring unit, shown in Figs. 4 and 5.

Similar numerals refer to similar parts throughout the several views.

Referring particularly to the figures shown on the first sheet of the drawings, numeral 10 indicates the spring unit generally, this unit being slightly constricted at its inner portion and extending outwardly at either end thereof.

The spring units are formed of wire which is coiled as shown and the upper end of the wire is bent outwardly to form a small eye 11 and then continues directly across the coil as clearly shown in Fig. 2, a downwardly facing eye 12 being formed therein, and third and fourth eyes 13 and 14 are formed at the opposite side of the spring coil, the wire being then continued back across the coil in parallelism to the first mentioned extension, where another eye 15 is formed. The wire is then continued in an arm or prong 16 which terminates in a double eye member 17.

The eyes or loops 11, 13 and 14 are positioned in a horizontal plane as is clearly shown in either Fig. 2 or Fig. 10. The eye 12 is positioned in a vertical plane, this eye being used only when the several spring units are placed in nested position with respect to each other. When this is done, the loop or hook 17 on the arm 16 engages with the corresponding eye member 12 on the adjacent coil. The eye 15 is also positioned in a vertical plane. It is necessary for the eye 15 to be in a vertical plane because, see Fig. 1, this eye member engages with the eye member 14, the latter being in a horizontal plane. Also, the double loop or eye member 17 is also in a vertical plane as this loop or hook engages with corresponding eye members 11 and 13.

The wire is continued downwardly and extends across the bottom of the coil, after being bent to form an eye 21, similar to the eye 11, and then continues to form eyes 22, 23, 24, 25 and arm 26, this arm terminating in a double hook 27, similar to the top of the coil. The interconnection of the top and bottom arm of the coil is exactly the same.

The connection between the several spring units is made in a manner which will be obvious to those skilled in this art. The spring units 10 are individually assembled. The spring units are slid together so that the eyes 13 and 14 abut the eyes 11 and 15, the eyes 15 and 14 being threaded through each other and the eyes 11 and 13 being positioned adjacent to each other. The eyes 11 and 13 are held together by the engagement of the loop member 17 therewith.

The connections between the spring units are exactly the same at the bottom thereof but will be in reverse relation as will be apparent from an inspection of Fig. 10.

Fig. 12 shows a typical connection between the several spring units as has just been recited. This view is specific to the modification shown in Figs. 4 and 5 but it will be apparent that this connection is exactly the same for the arms 26 on the same unit 10.

Referring now to Figs. 4 and 5, 30 designates the spring units proper, this spring unit being formed of wire in the usual fashion, and being continued at the top to form loops or eyes 31, 32, 33 and 34, and then continued in an arm 35 which terminates in a double eye member 36.

The portion of the wire between the several eyes is bowed inwardly, see Fig. 5, and in this manner forms a support for the force which will be exerted upon the top of the spring coil during its operation.

Figs. 6 and 7 disclose another modification. This modification consists of a coiled body 40 which is extended outwardly at its top and eyes 41, 42, 43 and 44 are formed therein, the last mentioned eye being in a vertical plane and the first mentioned eyes being in a horizontal plane. See Fig. 7. The wire is then continued at 45 to form an arm which terminates in the hooked member 46, this hook member functioning in the same manner as the double hook member 36. Fig. 8 discloses a perspective view of the arm.

The coil 40 is continued downwardly and has eyes 51, 52, 53 and 54 and an arm 55 which terminates in a double eye member 56.

Fig. 12 is a perspective view illustrating the connection between the spring unit as disclosed in Figs. 4 and 5. The arm member 35 is inserted through the eye member 33 and its double hook portion 36 engages the eyes 32 and 31. It is to be noted that the arm 35 extends underneath the eye 32 and thus prevents it from being forced downwardly and hence it is not necessary that this portion of the double eye member 36 be closed. The other part of the double eye member 36 is closed around the member 31. Thus, as the arm 35 may be forced downwardly during its operation, there will be no danger that the end of the wire forming that arm will come into contact with any of the coils of the spring thereby catching on them. This precludes any noise during the operation of the spring. As shown in Fig. 12, the several eyes have been closed in the usual manner after the spring units have been meshed with one another and the complete spring is now ready to be tempered in the usual manner.

From the above description it will be appreciated that I have inventively created a new type of integral spring which requires no fastening means whatsoever in order that a complete spring unit may be made and that such spring unit may be cheaply manufactured and which will give long and efficient service.

Having thus revealed this invention, I claim as new and desire to secure the following combinations and elements or equivalents thereof, by Letters Patent of the United States.

I claim:

1. A spring unit adapted to be combined with similar spring units comprising a coil of wire, the upper end of the wire of the coil having an eye formed therein, then extending across the top of the coil and having two spaced apart eyes formed near the periphery of the coil, next extending back across the top of the coil and having a fourth eye spaced a short distance from the first mentioned eye and lastly terminating in an arm extending away from the coil, said arm having hook means at its end.

2. A spring unit as recited in claim 1, in which the first mentioned extension across the top of the coil has an eye formed therein.

3. A spring unit as set forth in claim 1 in which the three first mentioned eyes are in the same plane as the extensions across the top of the coil and the fourth eye is in a plane at right angles thereto.

4. A spring unit comprising the elements in combination as set forth in claim 1 but also characterized by the fact that the lower end of the wire is bent similarly but in left hand fashion relative to the top portion.

5. A spring unit comprising a wire coiled to form a spring, the upper end of the spring being of U-shape and ending in an arm having a loop at its end, the sides of the U-shaped portion extending chord-like across the opening in the end of the spring and the corners of the U- shaped portion having eyes therein, said eyes consisting of an integral portion of the wire bent laterally and then return bent upon itself to form an eye, each part of each eye lying in the same plane, said return bent portion being slightly spaced from the laterally bent portion whereby rubbing therebetween is avoided.

6. A spring for use inside of mattresses and the like comprising a series of spaced spring units, each unit consisting of a coiled wire, the upper end of the wire terminating in an arm which has hook means at its free end, the other end of the arm having an eye therein, said wire continuing from the eye laterally by extending to a substantially oppositely located point on the coil, a second eye at this point, the wire then extending laterally for a short distance at substantially right angles to a line joining the first and second eyes, a third eye formed therein, the wire continuing from the third eye laterally by extending to a substantially oppositely located point on the coil, and a fourth eye at this point, said hook means at the end of said arm connecting the respective fourth eye of an adjacent coil with the third eye of a third coil and the first mentioned eye also being connected to the second eye of a second adjacent coil whereby uncoiling is prevented.

OTTO L. GOETHEL.